US012459501B2

(12) United States Patent
Fujimoto et al.

(10) Patent No.: US 12,459,501 B2
(45) Date of Patent: Nov. 4, 2025

(54) CONTROL SYSTEM AND CONTROL METHOD

(71) Applicant: HONDA MOTOR CO., LTD., Tokyo (JP)

(72) Inventors: Gakuyo Fujimoto, Wako (JP); Hideki Matsunaga, Wako (JP); Takashi Matsumoto, Wako (JP); Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 374 days.

(21) Appl. No.: 18/098,136

(22) Filed: Jan. 18, 2023

(65) Prior Publication Data

US 2023/0234566 A1 Jul. 27, 2023

(30) Foreign Application Priority Data

Jan. 21, 2022 (JP) ................................ 2022-007777

(51) Int. Cl.
*B60W 30/09* (2012.01)
*G06V 20/58* (2022.01)
(52) U.S. Cl.
CPC ............. *B60W 30/09* (2013.01); *G06V 20/58* (2022.01); *B60W 2420/403* (2013.01);
(Continued)
(58) Field of Classification Search
CPC ........... B60W 30/09; B60W 2420/403; B60W 2420/408; B60W 2554/4041; B60W 2554/4049; G06V 20/58
See application file for complete search history.

(56) References Cited

U.S. PATENT DOCUMENTS

2008/0266396 A1* 10/2008 Stein ...................... G06V 20/58
348/148
2012/0095633 A1 4/2012 Kume et al.
(Continued)

FOREIGN PATENT DOCUMENTS

EP 3225456 10/2017
JP 2011-177205 9/2011
(Continued)

OTHER PUBLICATIONS

Japanese Office Action for Japanese Patent application No. 2022-007777 mailed Dec. 5, 2023.

*Primary Examiner* — Khoi H Tran
*Assistant Examiner* — Tristan J Greiner
(74) *Attorney, Agent, or Firm* — Amin, Turocy & Watson, LLP

(57) ABSTRACT

A control system for a mobile object includes: a first sensor; a second sensor, different from the first sensor, that is mounted in the mobile object and is configured to detect an object by causing the mobile object to contact or approach the object; and a control device configured to recognize circumstances of the mobile object on the basis of a detection result from the first sensor and to control movement of the mobile object on the basis of the circumstances. The control device assumes that a second object which is not recognizable or hard to recognize is present at a reference position which is determined on the basis of a position of a prescribed first object when the first object has been recognized and causes the mobile object to move to a position at which the second sensor is able to detect the second object.

20 Claims, 10 Drawing Sheets

(52) U.S. Cl.
CPC ............... *B60W 2420/408* (2024.01); *B60W 2554/4041* (2020.02); *B60W 2554/4049* (2020.02)

(56) References Cited

U.S. PATENT DOCUMENTS

| | | | |
|---|---|---|---|
| 2013/0245877 A1* | 9/2013 | Ferguson | G06V 20/56 |
| | | | 701/23 |
| 2018/0239355 A1* | 8/2018 | Lee | G08G 1/166 |
| 2019/0086549 A1* | 3/2019 | Ushani | G05D 1/0088 |
| 2019/0291728 A1* | 9/2019 | Shalev-Shwartz | B60W 10/06 |
| 2020/0108841 A1* | 4/2020 | Jeon | B60W 30/18036 |
| 2022/0230446 A1* | 7/2022 | Miyamoto | G01S 15/93 |

FOREIGN PATENT DOCUMENTS

| | | |
|---|---|---|
| JP | 2012-106722 | 6/2012 |
| JP | 2016-101055 | 5/2016 |
| JP | 2020-004182 | 1/2020 |
| JP | 2020-102086 | 7/2020 |
| JP | 2020-189536 | 11/2020 |
| JP | 2020-197770 | 12/2020 |

\* cited by examiner

FIG. 15

| | BEHAVIOR OF MOBILE OBJECT FOR RECOGNIZING OBJECT | DETECTION RESULT FROM SENSOR | SUPPOSED POSITION OF OBJECT | BEHAVIOR OF MOBILE OBJECT |
|---|---|---|---|---|
| (1) | | | (x1, y1)–(x5, y5) | BEHAVIOR 1 |
| (2) | | | — | BEHAVIOR 2 |
| (3) | | | (x1, y1)–(x2, y2) | BEHAVIOR 3 |

CONTROL SYSTEM AND CONTROL METHOD

CROSS-REFERENCE TO RELATED APPLICATION

Priority is claimed on Japanese Patent Application No. 2022-007777, filed Jan. 21, 2022, the content of which is incorporated herein by reference.

BACKGROUND

Field

The present invention relates to a control system and a control method.

Description of Related Art

In the related art, a technique for a single-seated electrified vehicle that can move on a walkway has been disclosed (Japanese Unexamined Patent Application, First Publication No. 2020-189536).

SUMMARY

In the related art, processing associated with detection of an object near a mobile object has not been satisfactorily considered.

The present invention was made in consideration of the aforementioned circumstances and an objective thereof is to provide a control system and a control method that can support more accurate detection of an object.

A control system and a control method according to the present invention employ the following configurations.

(1) According to an aspect of the present invention, there is provided a control system for a mobile object, including: a first sensor; a second sensor, different from the first sensor, that is mounted in the mobile object and is configured to detect an object by causing the mobile object to contact or approach the object; and a control device configured to recognize circumstances of the mobile object on the basis of a detection result from the first sensor and to control movement of the mobile object on the basis of the circumstances, wherein the control device is configured to assume that a second object which is not recognizable or hard to recognize is present at a reference position which is determined on the basis of a position of a prescribed first object when the first object has been recognized and to cause the mobile object to move to a position at which the second sensor is able to detect the second object.

(2) In the aspect of (1), the control device may be configured to control movement of the mobile object without assuming that the second object is present when a third object other than the first object has been recognized.

(3) According to another aspect of the present invention, there is provided a control system for a mobile object, including: a first sensor; a second sensor, different from the first sensor, that is mounted in the mobile object and is configured to detect an object by causing the mobile object to contact or approach the object; and a control device configured to recognize circumstances of the mobile object on the basis of a detection result from the first sensor, to recognize a position of the mobile object, and to control movement of the mobile object on the basis of the circumstances, wherein the control device is configured to assume that a second object which is not recognizable or hard to recognize is present at a reference position which is determined on the basis of a position of a first object within a predetermined range from a prescribed position when the mobile object has been recognized to have reached the prescribed position and to cause the mobile object to move to a position at which the second sensor is able to detect the second object.

(4) In the aspect of (3), the control device may be configured to control movement of the mobile object without assuming that the second object is present when the mobile object has not been recognized to have reached the prescribed position.

(5) In the aspect of any one of (1) to (4), the control device may be configured to determine whether the mobile object contacts or approaches an object on the basis of a detection result from the second sensor, and the control device may be configured to cause the mobile object to move in a second direction perpendicular to a first direction which is a moving direction of the mobile object immediately before the mobile object contacts or approaches the object when it is determined that the mobile object has contacted or approached the object on the basis of the detection result from the second sensor by causing the mobile object to move to a position at which the second object is able to be detected by the second sensor.

(6) In the aspect of (5), the control device may be configured to confirm that the second object is present and to cause the mobile object to perform behavior for avoiding the second object when it is determined that the mobile object has contacted or approached the second object by causing the mobile object to move for a predetermined time or a predetermined distance in the perpendicular direction.

(7) In the aspect of (5) or (6), the control device may be configured to determine that the second object is not present and to cause the mobile object to move in the first direction when it is determined that the mobile object has not contacted or approached the second object by causing the mobile object to move for a predetermined time or a predetermined distance in the perpendicular direction.

(8) In the aspect of any one of (1) to (7), the control device may be configured to determine whether the mobile object contacts or approaches an object on the basis of a detection result from the second sensor, and the control device may be configured to perform a process of causing the mobile object to move to a position at which the second object is able to be detected by the second sensor and to determine that the second object is not present and to cause the mobile object to move such that the mobile object passes through the reference position when it is determined that the mobile object has contacted or approached the object on the basis of the detection result from the second sensor by causing the mobile object to move to a position at which the second object is able to be detected by the second sensor.

(9) In the aspect of any one of (1) to (7), the first sensor may include one or more of a radar device, a camera, and a LIDAR device.

(10) In the aspect of (9), the second object may be an object of which a length in a vertical direction is less than a reference value and which is hard to recognize or which is not recognizable on the basis of a detection result from the radar device, the camera, and the LIDAR device.

(11) According to another aspect of the present invention, there is provided a control method that is performed by a computer of a control system for a mobile object, the control method including: a recognition process of recognizing circumstances of the mobile object on the basis of a detection result from a first sensor; and a control process of controlling movement of the mobile object on the basis of the circumstances, wherein, when a prescribed first object has been recognized through the recognition process, it is assumed that a second object which is not recognizable or hard to recognize is present at a reference position which is determined on the basis of a position of the first object, and the mobile object is caused to move to a position at which the second object is able to be detected by a second sensor, different from the first sensor, that is mounted in the mobile object and is configured to detect an object by causing the mobile object to contact or approach the object.

(12) According to another aspect of the present invention, there is provided a storage medium storing a program causing a computer of a control system for a mobile object to perform: a recognition process of recognizing circumstances of the mobile object on the basis of a detection result from a first sensor; and a control process of controlling movement of the mobile object on the basis of the circumstances, wherein, when a prescribed first object has been recognized through the recognition process, it is assumed that a second object which is not recognizable or hard to recognize is present at a reference position which is determined on the basis of a position of the first object, and the mobile object is caused to move to a position at which the second object is able to be detected by a second sensor, different from the first sensor, that is mounted in the mobile object and is configured to detect an object by causing the mobile object to contact or approach the object.

(13) According to another aspect of the present invention, there is provided a control method that is performed by a computer of a control system for a mobile object, the control method including: a recognition process of recognizing circumstances of the mobile object on the basis of a detection result from a first sensor; a control process of controlling movement of the mobile object on the basis of the circumstances; and a position recognition process of recognizing a position of the mobile object, wherein, when the mobile object has been recognized to have reached a prescribed position through the position recognition process, it is assumed that a second object which is not recognizable or hard to recognize through the recognition process is present at a reference position which is determined on the basis of the position of the first object within a predetermined range from the prescribed position, and the mobile object is caused to move to a position at which the second object is able to be detected by a second sensor, different from the first sensor, that is mounted in the mobile object and is configured to detect an object by causing the mobile object to contact or approach the object.

(14) According to another aspect of the present invention, there is provided a storage medium storing a program causing a computer of a control system for a mobile object to perform: a recognition process of recognizing circumstances of the mobile object on the basis of a detection result from a first sensor; a control process of controlling movement of the mobile object on the basis of the circumstances; and a position recognition process of recognizing a position of the mobile object, wherein, when the mobile object has been recognized to have reached a prescribed position through the recognition process, it is assumed that a second object which is not recognizable or hard to recognize through the recognition process is present at a reference position which is determined on the basis of the position of the first object within a predetermined range from the prescribed position, and the mobile object is caused to move to a position at which the second object is able to be detected by a second sensor, different from the first sensor, that is mounted in the mobile object and is configured to detect an object by causing the mobile object to contact or approach the object.

According to the aspects of (1) to (14), the control device can support more accurate detection of an object. For example, the control device can cause a mobile object to move to a position at which an object which is not recognizable or which is hard to recognize can be detected by the second sensor as a support for recognizing an object. The control device can more accurately detect an object and allow the mobile object to move more smoothly to a destination by controlling movement of the mobile object on the basis of the detection result.

BRIEF DESCRIPTION OF THE DRAWINGS

FIG. 15 is a diagram illustrating an example of details of correspondence information.

DETAILED DESCRIPTION

Hereinafter, a control system that is mounted in a mobile object and a control method according to an embodiment of the present invention will be described with reference to the accompanying drawings. A mobile object moves on both a roadway and a predetermined area other than a roadway. The predetermined area is, for example, a walkway. The predetermined area may be some or all of a road shoulder, a bicycle lane, a public open space, and the like or may include all of a walkway, a road shoulder, a bicycle lane, and a public open space. In the following description, it is assumed that the predetermined area is a walkway. In the following description, the word "walkway" can be appropriately replaced with "predetermined area."

In the following description, a forward direction of the mobile object is referred to as a plus X direction, a rearward direction of the mobile object is referred to as a minus X direction, a rightward direction (a right side when the mobile object faces the plus X direction) in a direction perpendicular to a front-rear direction is referred to as a plus Y direction, a leftward direction (a left side when the mobile object faces the plus X direction) in the direction perpendicular to the front-rear direction is referred to as a minus Y direction, a vertical upward direction which is perpendicular to the X direction and the Y direction is referred to as a plus Z direction, and a vertical downward direction which is perpendicular to the X direction and the Y direction is referred to as a minus Z direction.

Embodiment

Figure 1:
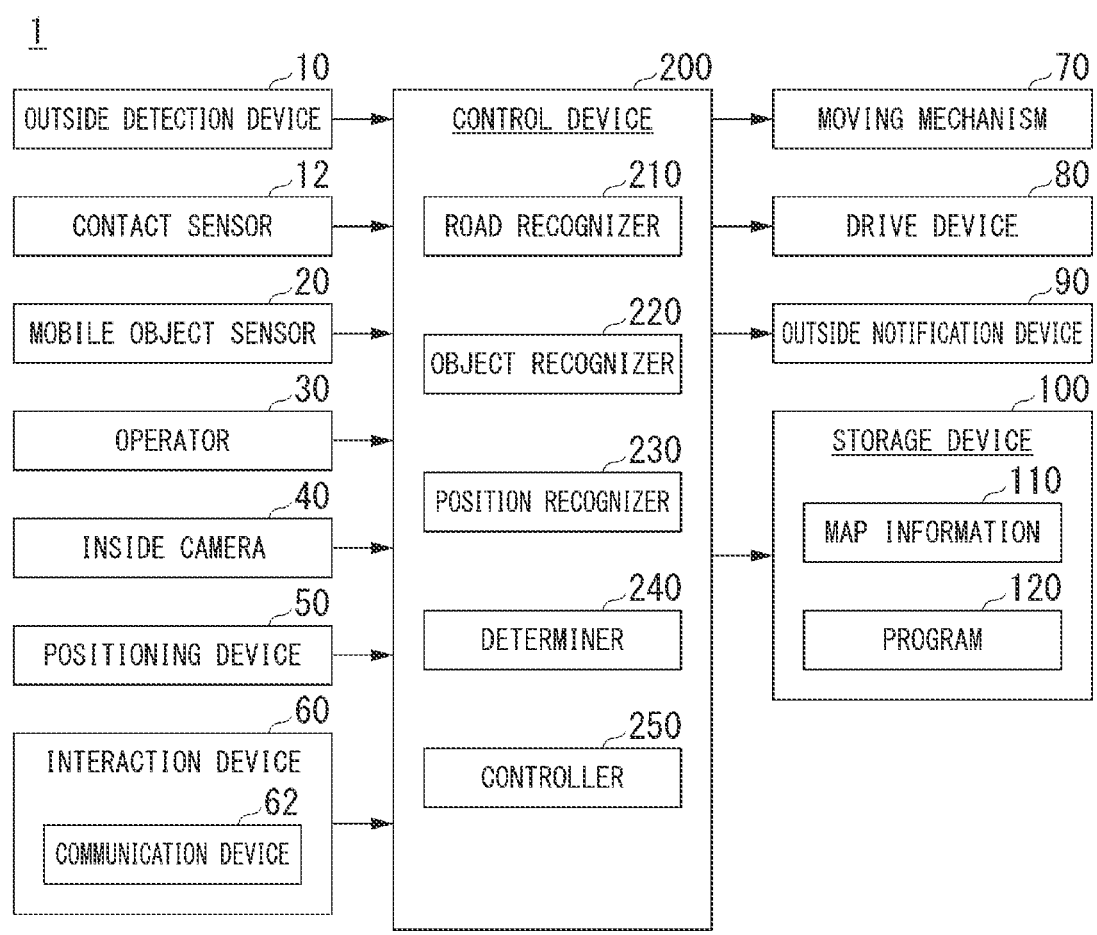
FIG. 1 is a diagram illustrating an example of configurations of a mobile object and a control device according to an embodiment.

FIG. 1 is a diagram illustrating an example of configurations of a mobile object 1 and a control device 200 according to an embodiment. For example, an outside detection device 10 (an example of a first sensor), a contact sensor 12 (an example of a second sensor), a mobile object sensor 20, an operator 30, an inside camera 40, a positioning device 50, an interaction device 60, a moving mechanism 70, a drive device 80, an outside notification device 90, a storage device 100, and a control device 200 are mounted in the mobile object 1. Out of these constituents, some constituents which are not essential to implement functions according to the present invention may be omitted.

The outside detection device 10 includes various types of devices that detect a forward space in a traveling direction of the mobile object 1. The outside detection device 10 includes, for example, an outside camera, a radar device, a light detection and ranging device (LIDAR), and a sensor fusion device. The outside detection device 10 outputs information indicating the detection results (such as an image or a position of an object) to the control device 200.

The contact sensor 12 is a sensor that detects contact of the mobile object 1 with an object. The contact sensor 12 is a sensor that detects contact with an object by detecting a change of an output value such as an electrical resistance value or a capacitance when the mobile object 1 comes into contact with an object. In this embodiment, for example, it is assumed that the contact sensor 12 is a pressure sensor.

The mobile object sensor 20 includes, for example, a speed sensor, an acceleration sensor, a yaw rate (angular velocity) sensor, a direction sensor, and an operation amount sensor that is attached to the operator 30. The operator 30 includes, for example, an operator used to instruct acceleration/deceleration (for example, an accelerator pedal or a brake pedal) and an operator used to instruct steering (for example, a steering wheel). In this case, the mobile object sensor 20 may include an accelerator operation amount sensor, a brake depression amount sensor, and a steering torque sensor. The mobile object 1 may include an operator of a form other than that described above (for example, a rotary operator with a shape other than a ring shape, a joystick, or a button) as the operator 30.

The inside camera 40 images at least the head of an occupant of the mobile object 1 from the front. The inside camera 40 is a digital camera using an imaging device such as a charge-coupled device (CCD) or a complementary metal oxide semiconductor (CMOS). The inside camera 40 outputs a captured image to the control device 200.

The positioning device 50 is a device that measures a position of the mobile object 1. The positioning device 50 is, for example, a global navigation satellite system (GNSS) receiver and is configured to identify the position of the mobile object 1 on the basis of signals received from GNSS satellites and to output the identified position as position information. The position information of the mobile object 1 may be estimated from a position of a Wi-Fi base station to which a communication device which will be described later is connected.

The interaction device 60 includes, for example, a speaker, a microphone, a touch panel, and a communication device 62. The interaction device 60 appropriately processes vocal sound of an occupant collected by the microphone, transmits the processed vocal sound to a server device via a network using the communication device 62, and outputs vocal information from the speaker on the basis of information returned from the server device. The interaction device 60 may be referred to as an agent device, a concierge device, or an assistance device. The server device has a vocal sound recognizing function, a natural language processing function, a semantic interpretation function, and a reply detail determining function. The interaction device 60 may transmit the position information to the server device, and the server device may return information of a corresponding facility on the basis of the position information and a guidance request uttered by the occupant (for example, "What's a good ramen restaurant near here?"). In this case, vocal guidance such as "If you turn left up here there's one there," is performed by the interaction device 60. The interaction device 60 is not limited thereto and has a function of receiving a natural utterance from the occupant and returning an appropriate reply. The interaction device 60 has a function of holding a simple conversation without using the server device such as asking a question and receiving a reply and may ask the occupant a question in response to a request from the control device 200.

The moving mechanism 70 is a mechanism for causing the mobile object 1 to move on a road. The moving mechanism 70 is, for example, a wheel group including turning wheels and driving wheels. The moving mechanism 70 may include legs for multiped walking.

The drive device 80 causes the mobile object 1 to move by outputting a force to the moving mechanism 70. For example, the drive device 80 includes a motor that drives the driving wheels, a battery that stores electric power to be supplied to the motor, a steering device that adjusts a turning angle of the turning wheels, and a brake device that is controlled on the basis of information input from the control device 200 or information input from the operator 30. The drive device 80 may include an internal combustion engine or a fuel cell as a driving force output means or a power generation means.

The outside notification device 90 is provided, for example, in an outer panel of the mobile object 1 and includes a lamp, a display device, or a speaker for notifying the outside of the mobile object 1 of information. The outside notification device 90 performs different operations in a state in which the mobile object 1 is moving on a walkway and a state in which the mobile object 1 is moving on a roadway. For example, the outside notification device 90 is controlled such that the lamp emits light when the mobile object 1 is moving on a walkway and the lamp does not emit light when the mobile object 1 is moving on a roadway. The color of light emitted from the lamp is preferably a color which is determined by the law. The outside notification device 90 may be controlled such that the lamp emits green light when the mobile object 1 is moving on a walkway and the lamp emits blue light when the mobile object 1 is moving on a roadway. When the outside notification device 90 is a display device, the outside notification device 90 displays text or graphics indicating "moving on a walkway" when the mobile object 1 is moving on a walkway.

Figure 2:
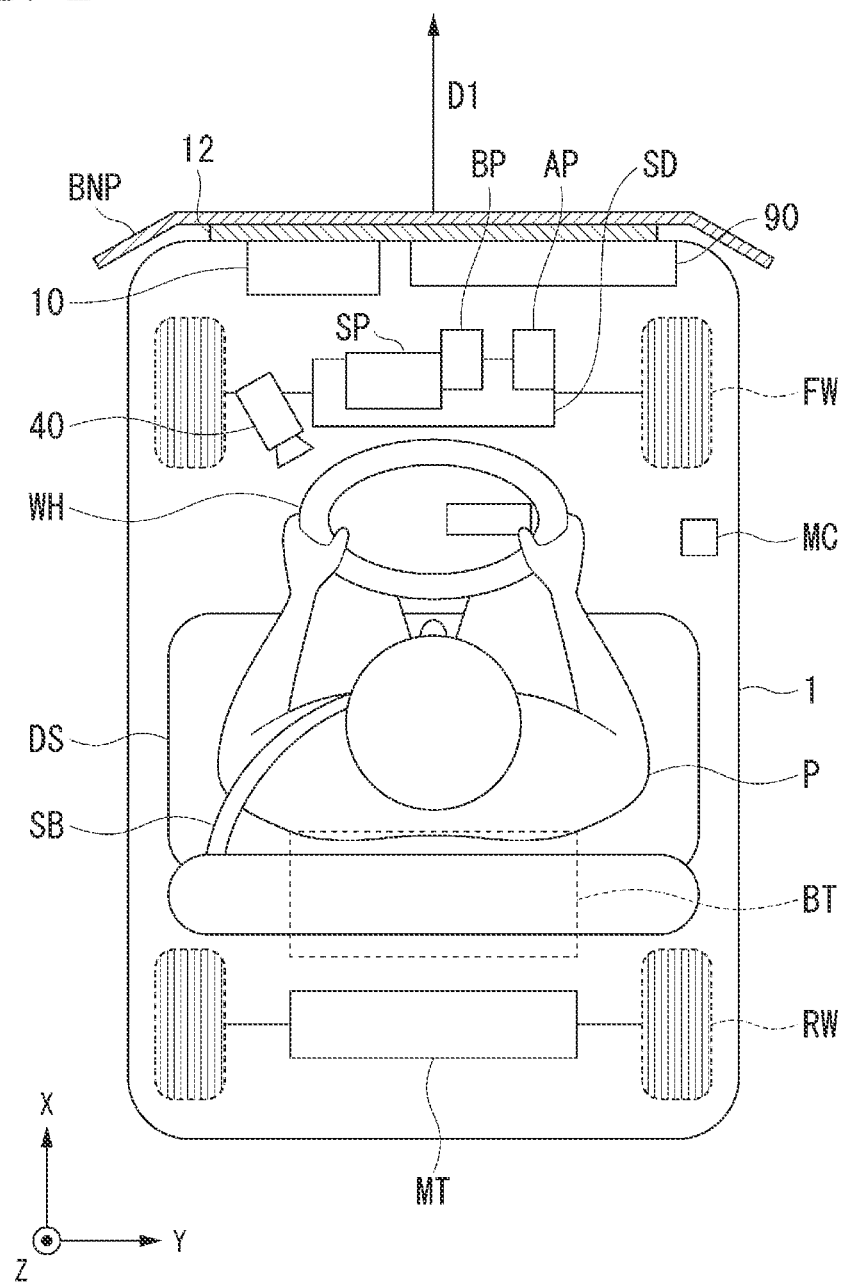
FIG. 2 is a perspective view of the mobile object from above.

FIG. 2 is a perspective view of the mobile object 1 from above. In the drawing, FW denotes turning wheels, RW denotes driving wheels, SD denotes a steering device, MT denotes a motor, and BT denotes a battery. The steering device SD, the motor MT, and the battery BT are included in the drive device 80. AP denotes an accelerator pedal, BP denotes a brake pedal, WH denotes a steering wheel, SP denotes a speaker, and MC denotes a microphone. The illustrated mobile object 1 is a single-seated mobile object, and an occupant P sits on a driver's seat DS and wears a seat belt SB. Arrow D1 denotes a traveling direction (a velocity vector) of the mobile object 1. The outside detection device 10 is provided in the vicinity of a front end of the mobile object 1, and the inside camera 40 is provided at a position at which the head of the occupant P can be imaged from the front of the occupant P. The outside notification device 90 which is a display device is provided in the vicinity of the front end of the mobile object 1.

Figure 3:
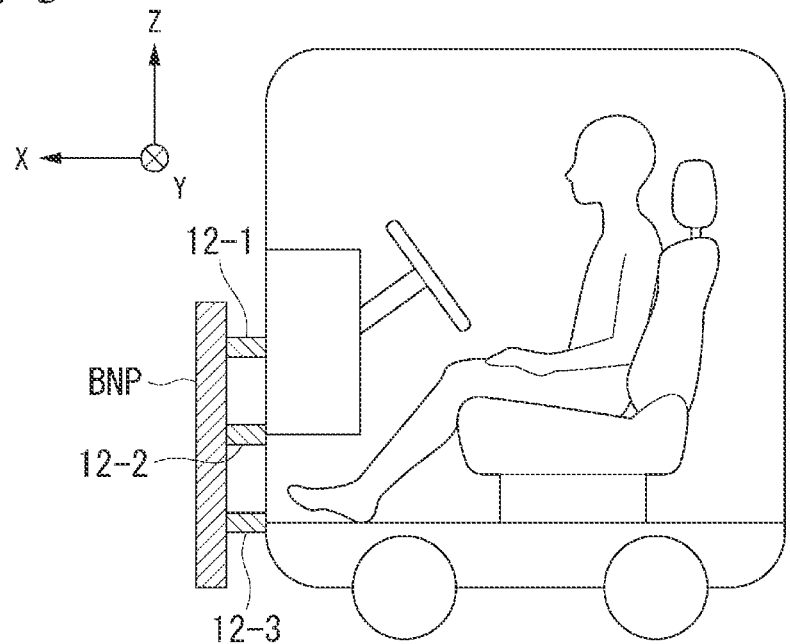
FIG. 3 is a view of the mobile object from one side (in a plus Y direction).

FIG. 3 is a view of the mobile object 1 from one side (in a plus Y direction). A bumper unit BNP is provided in front (in the X direction) of the mobile object 1. The contact sensor 12 (12-1 to 12-3) is provided between the bumper unit BNP and the mobile object 1. The contact sensor 12 is provided at a position at which a force applied to the bumper unit BNP due to contact can be detected when the bumper unit BNP comes into contact with an object. The bumper unit BNP is provided, for example, at a height at which a viewing field of the occupant is not blocked when the occupant is in the mobile object 1.

Referring back to FIG. 1, for example, the storage device 100 is a non-transitory storage device such as a hard disk drive (HDD), a flash memory, or a random access memory (RAM). Map information 110, a program 120 that is executed by the control device 200, and the like are stored in the storage device 100. The storage device 100 is illustrated outside of the frame of the control device 200 in FIG. 1, but the storage device 100 may be included in the control device 200.

[Control Device]

The control device 200 includes, for example, a road recognizer 210, an object recognizer 220, a position recognizer 230, a determiner 240, and a controller 250. The road recognizer 210, the object recognizer 220, the position recognizer 230, the determiner 240, and the controller 250 are implemented, for example, by causing a hardware processor such as a central processing unit (CPU) to execute a program (software). Some or all of these constituents may be implemented by hardware (a circuit unit including circuitry) such as a large scale integration (LSI) chip, an application-specific integrated circuit (ASIC), a field-programmable gate array (FPGA), or a graphics processing unit (GPU), or may be implemented by a combination of software and hardware. The program may be stored in a storage device (not illustrated) in advance or may be stored in a detachable storage medium (a non-transitory storage medium) such as a DVD or a CD-ROM and may be installed in the storage device by setting the storage medium to a drive device.

The road recognizer 210 recognizes whether the mobile object 1 is moving on a roadway or moving on a walkway. The road recognizer 210 recognizes whether the mobile object 1 is moving on a roadway or moving on a walkway, for example, by analyzing an image captured by the outside camera of the outside detection device 10. An example of image analysis is semantic segmentation. The road recognizer 210 classifies pixels in a frame of an image into classes (such as a roadway, a walkway, a boundary, and an object), labels the pixels, recognizes that the mobile object 1 is moving on a roadway when many pixels which are labeled as a roadway are included in an area in front of the mobile object 1, and recognizes that the mobile object 1 is moving on a walkway when many pixels which are labeled as a walkway are included in the area in front of the mobile object 1 in the image. The road recognizer 210 is not limited thereto and may recognize that the mobile object 1 is moving on a roadway when a vehicle is recognized in the area in front of the mobile object 1 in the image and recognize that the mobile object 1 is moving on a walkway when a pedestrian is recognized in the area in front of the mobile object 1 in the image. The road recognizer 210 may recognize that the mobile object 1 is moving on a roadway when a road surface area in front of the mobile object 1 in the image has a large width and recognize that the mobile object 1 is moving on a walkway when the road surface area in front of the mobile object 1 in the image has a small width. The road recognizer 210 may recognize whether the mobile object 1 is moving on a roadway or moving on a walkway by comparing the position information of the mobile object 1 with the map information 110. In this case, the map information needs to have such precision that a walkway and a roadway can be distinguished on the basis of position coordinates thereof. When the "predetermined area" is not a walkway, the road recognizer 210 performs the same process on a roadside strip, a bicycle lane, a public open space, or the like.

The object recognizer 220 recognizes an object near the mobile object 1 on the basis of an output of the outside detection device 10. Examples of the object include some or all of obstacles such as a mobile object such as a vehicle, a bicycle, or a pedestrian, a traveling road boundary such as a lane marking, a curbstone, a guard rail, a road shoulder, or a median, a structure installed on a road such as a road sign or a signboard, a fallen object located (fallen) on a traveling road, and an object present in the traveling direction of the mobile object 1. For example, the object recognizer 220 may acquire information such as presence, position, and type of another mobile object by inputting the captured image from the outside camera to a trained model which has been trained to output information such as presence, position, and type of an object when an image captured by the outside camera of the outside detection device 10 is input. The type of another mobile object may be estimated on the basis of sizes in an image, intensities of reflected waves received by a radar device of the outside detection device 10, or the like. The object recognizer 220 may acquire, for example, a speed of another mobile object detected using Doppler Shift or the like by the radar device. The object recognizer 220 may recognize an obstacle on the basis of information input from the LIDAR 12 as will be described later. The object recognizer 220 may be included in the outside detection device instead of the control device 200.

The object recognizer 220 may recognize a type of an object, for example, on the basis of a shape or a size of the object or the like. For example, the object recognizer 220 recognizes whether the recognized object is a predetermined type of object. The predetermined type of object (a first object) is, for example, a pole or a post which will be described later and is such a type of object with a higher likelihood that a linear object such as a rope or a chin will be present than that of another object (a third object). Examples of the linear object additionally include a large-meshed fence using thin threads or wires.

The position recognizer 230 acquires information of a position measured by the positioning device 50 and determines whether the acquired position is a prescribed position. Information of the prescribed position is stored in the storage device 100.

The determiner 240 determines whether the mobile object 1 has come into contact with an object on the basis of a detection result from the contact sensor 12. For example, when an output value of a signal from the contact sensor 12 is equal to or greater than a threshold value, the determiner 240 determines that the mobile object 1 has come into contact with an object.

The controller 250 generates a trajectory, for example, with reference to information of the traveling road based on the output of the road recognizer 210 and information of the object based on the output of the object recognizer 220 and controls the drive device 80 such that the mobile object 1 travels autonomously along the generated trajectory. The trajectory is a trajectory along which the mobile object 1 will travel autonomously (without requiring a driver's operation) in the future. A trajectory includes, for example, a speed element. For example, a trajectory is expressed by sequentially arranging points (trajectory points) at which the mobile object 1 is to arrive. Trajectory points are points at which the mobile object 1 is to arrive at intervals of a predetermined traveling distance (for example, about several [m]) along a road, and a target speed and a target acceleration at intervals of a predetermined sampling time (for example, below the decimal point [sec]) are generated as a part of a target trajectory in addition. Trajectory points may be positions at which the mobile object 1 is to arrive at sampling timings every predetermined sampling time. In this case, information of a target speed or a target acceleration is expressed by intervals between the trajectory points.

For example, when the mobile object 1 is moving on a roadway, the controller 250 controls the motor MT, the brake device, and the steering device of the drive device 80 such that the mobile object 1 moves while maintaining a distance from an object near the mobile object 1 to be equal to or greater than a first distance. When the mobile object 1 is moving on a walkway, the controller 250 controls the motor MT, the brake device, and the steering device of the drive device 80 such that the mobile object 1 moves while maintaining a distance from an object in front of the mobile object 1 to be equal to or greater than a second distance. The second distance is, for example, a distance longer than the first distance. When the mobile object 1 moves with a driver's operation, the controller 250 controls the drive device 80 on the basis of a user's operation of an operator such that the mobile object 1 moves in a mode corresponding to the operation. As described above, the mobile object 1 moves by autonomous driving or a user's operation. In case of autonomous driving, an occupant may not be in the mobile object 1.

[Specific Example of Control of Mobile Object]

The controller 250 controls the mobile object 1 on the basis of the type of an object recognized by the object recognizer 220. For example, the controller 250 switches a moving mode (a control mode) of the mobile object 1 according to the type of an object. Specific examples will be described below. These controls are performed by the controller 250.

[Case (Third Object) in which Type of Object is not First Object]

When the object recognizer 220 recognizes a third object other than the first object, the controller 250 controls movement of the mobile object 1 without considering a second object (not based on the assumption or supposition that a second object is present). A case in which "a second object is assumed (supposed) to be present" will be described later.

Figure 4:
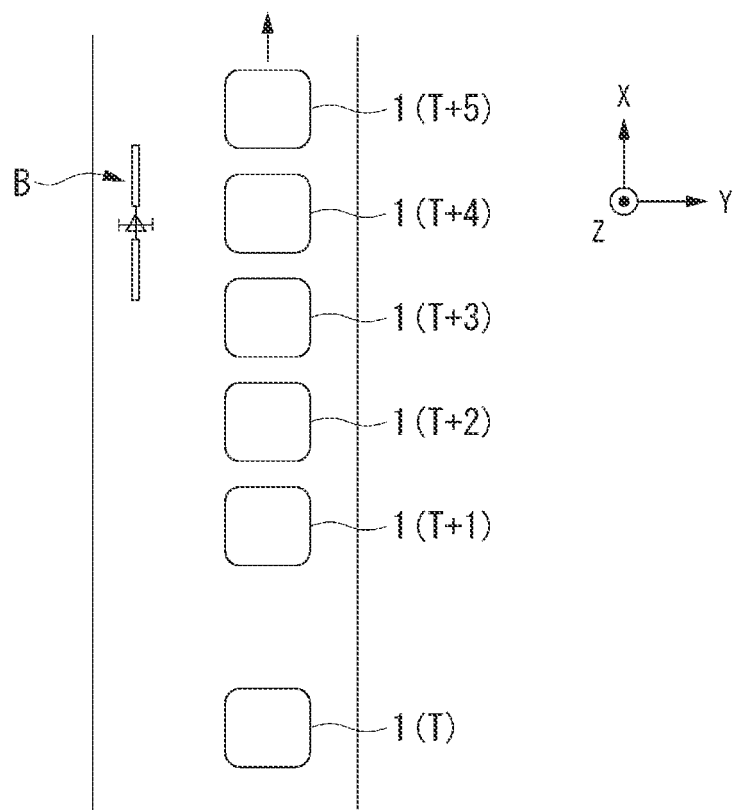
FIG. 4 is a (first) diagram illustrating an example of a movement mode of the mobile object.

FIG. 4 is a (first) diagram illustrating an example of a movement mode of the mobile object 1. At time T, it is assumed that the mobile object 1 has recognized a bicycle B (an example of a third object). In this case, the mobile object 1 decelerates at time T+1 and passes by the bicycle B such that a distance from the bicycle B is not equal to or greater than a predetermined distance at times T+2 to T+5.

[Case in which Type of Object is First Object]

When the object recognizer 220 recognizes a first object, the controller 250 causes the mobile object 1 to move to a position at which a second object which is present at a reference position near the first object and which is not able for the object recognizer 220 to recognize or which is hard to recognize can be detected by the second sensor. The controller 250 assumes (or supposes) that the second object which is not able for the object recognizer 220 to recognize is present at the reference position near the first object (or the reference position which is determined on the basis of the position of the first object) and causes the mobile object 1 to approach or arrive at the reference position such that the contact sensor 12 detects the second object.

Figure 5:
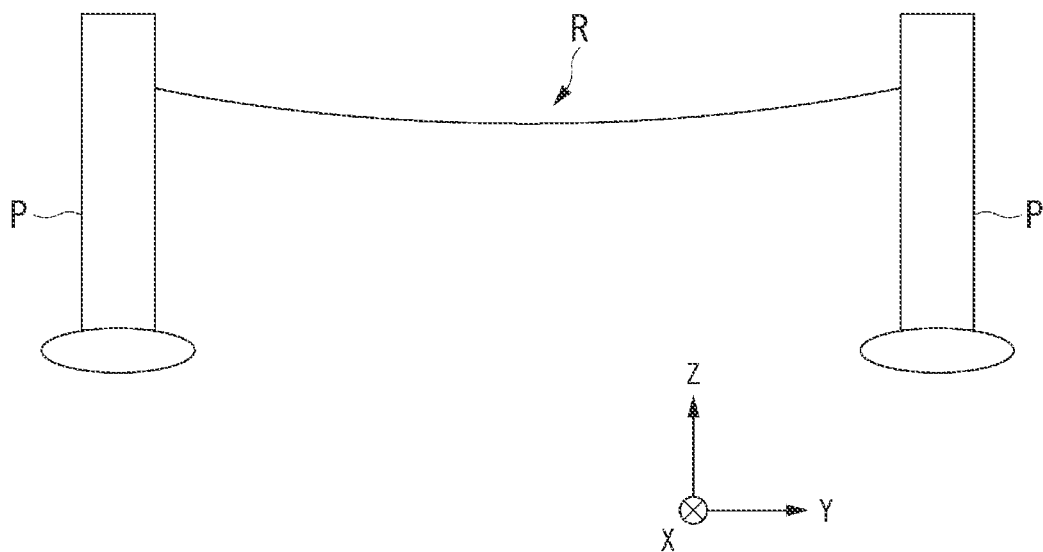
FIG. 5 is a diagram illustrating an example of a first object.

FIG. 5 is a diagram illustrating an example of the first object. When a pole P which is an example of the first object is recognized, the mobile object moves in a movement mode different from that when a bicycle B (a third object) is recognized. For example, it is assumed that a second object with a small length in the vertical direction and a large length in the horizontal direction such as a rope R or a chain is suspended between two poles P as illustrated in FIG. 5. The first object is not limited to a pole and may be a post or an object on which a second object with a small length in the vertical direction and a large length in the horizontal direction (a second object of which the length in the vertical direction is less than a reference value) is estimated to be suspended. Information of the first object is stored in the storage device 100.

The second object is an object which is hard for the object recognizer 220 to recognize or which is not recognizable on the basis of a detection result from the radar device, an image captured by the camera, and a detection result from the LIDAR device.

The outside detection device 10 of the mobile object 1 may not be able to detect a second object with a small length in the vertical direction and a large length in the horizontal direction as described above. For example, in an image captured by an outside camera, since the number of pixels of the second object in the image is small and information for recognizing the second object is small, the object recognizer 220 may not be able to recognize the second object on the basis of the image. For example, when the radar device is used, a measured value of reflected waves bouncing back from a second object by emitting electromagnetic waves is small, and the object recognizer 220 may have difficulty distinguishing reflected waves and noise or identifying the second object on the basis of the small measured value. For example, when the LIDAR device is used, a light scanning direction of the LIDAR device is parallel to the shape of the second object. When a part or whole of the second object is present between scanning light beams, the object recognizer 220 may not be able to recognize the second object or may not be able to detect the whole second object.

When the object recognizer 220 recognizes a first object using the outside detection device 10 and cannot recognize a second object, the following control is performed.

Figure 6:
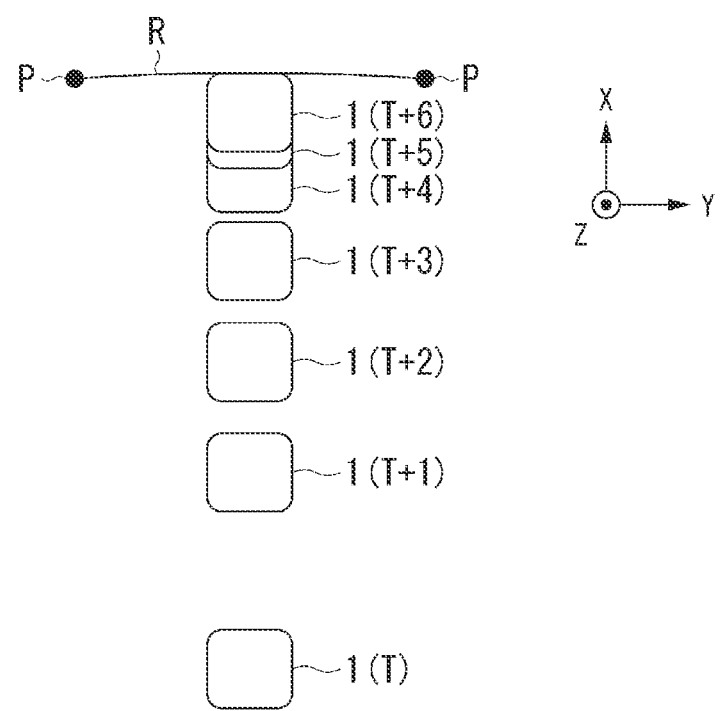
FIG. 6 is a (second) diagram illustrating an example of a movement mode of the mobile object.

FIG. 6 is a (second) diagram illustrating an example of a movement mode of the mobile object 1. At time T, it is assumed that the mobile object 1 recognizes a pole P. In this case, at time T+1, the mobile object 1 decelerates and approaches the pole P. At time T+2, the mobile object 1 decelerates further. At this time, it is assumed that the object recognizer 220 has performed a process of recognizing whether an object (for example, a rope) is present between two poles P and has not been able to recognize that an object is present between the two poles P. In this case, the mobile object 1 may move to a position other than a position at which the recognition process has been performed and perform the recognition process again at the new position. The recognition process is a process of recognizing an object which is performed using the outside detection device 10.

At time T+3, the mobile object 1 moves while decelerating. At time T+4, the mobile object 1 assumes that an object (a second object) is present between the two poles P and moves on the basis of the assumption. For example, the mobile object 1 is controlled such that the mobile object 1 comes into contact with the assumed second object. For example, the mobile object 1 is caused to approach or arrive at a reference position such that the contact sensor 12 detects the second object. The reference position (a position at which the second object is assumed to be present) is, for example, a position corresponding to a line connecting reference positions of the two poles (the same position as the rope R in FIG. 6). The reference position may be a position which is predetermined on the basis of the position of the first object instead of the aforementioned position.

At time T+5, the mobile object 1 further decelerates, and the mobile object 1 moves to arrive at the reference position at a predetermined speed or lower. The predetermined speed is a low speed or an arbitrary speed such as 5 km/h or 1 km/h. The predetermined speed is, for example, a speed at which the mobile object 1 can recognize contact with the second object on the basis of a detection result from the contact sensor 12 and an impact applied to the mobile object 1 is equal to or less than a predetermined extent when the mobile object 1 has come into contact with the object. At time T+6, the mobile object 1 comes into contact with the rope R, and the mobile object 1 recognizes contact with the second object.

As described above, the mobile object 1 can recognize the second object by coming into contact with the second object which has not been recognized by the object recognizer 220.

When the determiner 240 determines that the mobile object 1 has come into contact with the second object on the basis of a detection result from the contact sensor 12 by causing the mobile object 1 to approach or arrive at the reference position (by causing the mobile object 1 to move to the position at which the second object is able to be detected by the second sensor), the controller 250 causes the mobile object 1 to move in a second direction perpendicular to a first direction which is a moving direction of the mobile object 1 immediately before coming into contact.

Figure 7:
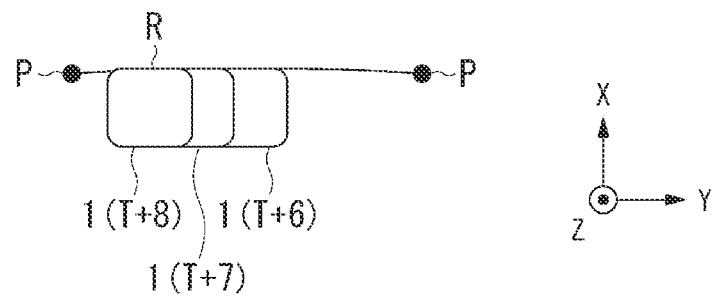
FIG. 7 is a (second) diagram illustrating an example of a movement mode of the mobile object.

FIG. 7 is a (second) diagram illustrating an example of a movement mode of the mobile object 1. The mobile object 1 comes into contact with the second object at time T+6, and then moves in a direction (or a direction in which the pole P is present) perpendicular (or substantially perpendicular) to the current traveling direction, for example, while maintaining contact with the second object at time T+7. At time T+8, the mobile object 1 further moves in the perpendicular direction.

Figure 8:
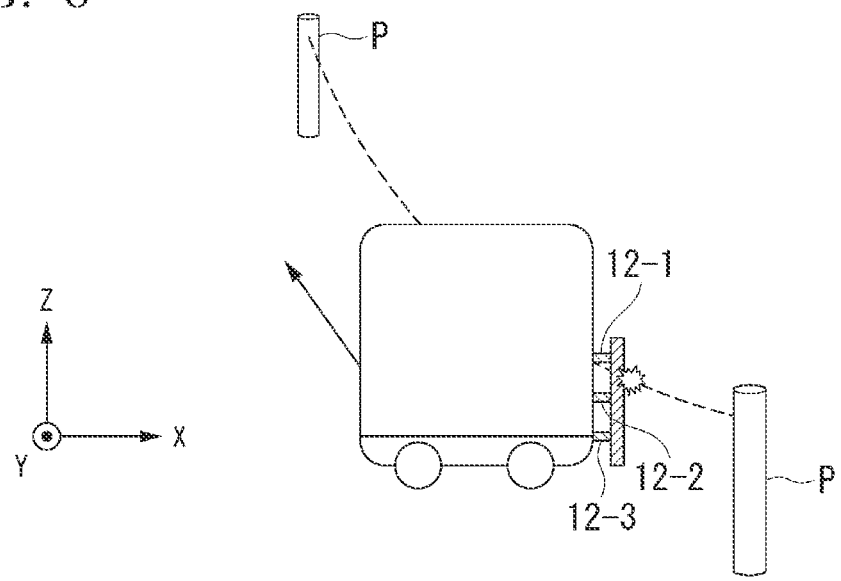
FIG. 8 is a side view of the mobile object in a lateral direction.

FIG. 8 is a view of the mobile object 1 in the lateral direction. When the mobile object 1 comes into contact with the second object as illustrated in FIG. 8, the mobile object 1 moves in the direction in which the pole P is present (in the plus Y direction).

Figure 9:
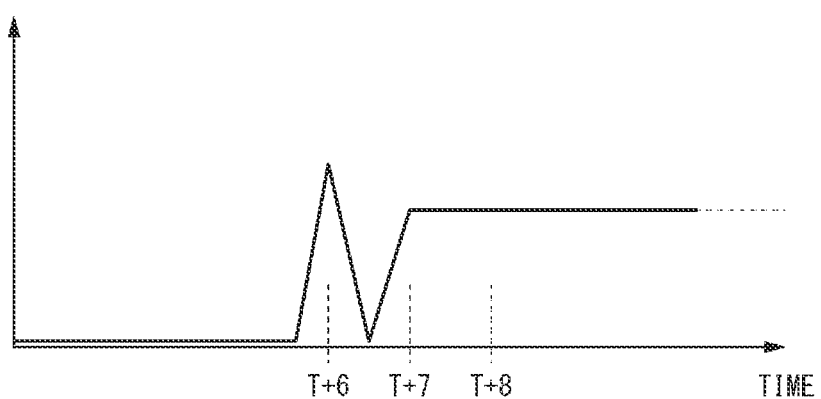
FIG. 9 is a diagram illustrating an example of a temporal change of an output value of a contact sensor.

FIG. 9 is a diagram illustrating an example of a temporal change of an output value of the contact sensor. The vertical axis in FIG. 9 represents the output value of the contact sensor, and the horizontal axis in FIG. 9 represents the time. The output value before the mobile object 1 has come into contact with an object changes to zero or a value close to zero, and the output value when the mobile object 1 comes into contact with the object (at time T+6) increases (for example, becomes equal to or greater than a threshold value). Accordingly, the control device 200 can recognize that the mobile object 1 has come into contact with an object.

Since the mobile object 1 moves in the direction in which the pole P is present while maintaining contact with the second object after the mobile object 1 has come into contact with the second object, the output value is maintained at a predetermined output value or greater. In this way, when the output value is maintained at the predetermined output value or greater while the mobile object 1 is moving in the lateral direction, the control device 200 determines that an object which is not able for the object recognizer 220 to recognize is present between the two poles P.

When the determiner 240 determines that the mobile object 1 contacts or approaches the second object when the mobile object 1 has moved for a predetermined time or a predetermined distance in the perpendicular direction, the controller 250 confirms that the second object is present and causes the mobile object 1 to perform behavior for avoiding the second object. For example, the controller 250 causes the mobile object 1 to move to a destination along a different route or causes the mobile object 1 to move to a destination while passing by the outside of the pole P.

When it is recognized that the second object is present, the mobile object 1 may perform a process of recognizing an object while moving in the vicinity of the object in contact in order to recognize a specific position of the object. For example, the mobile object 1 may detect an object using the outside detection device 10 by changing a position of the mobile object 1 relative to the pole P or the rope R or changing the posture of the mobile object 1.

As described above, the controller 250 can recognize a position or presence of a second object by causing the mobile object 1 to come into contact with the second object.

[Case in which Second Object is not Present]

When the mobile object 1 is caused to approach or arrive at the reference position (the process of causing the mobile object 1 to move to the position at which the second object cannot be detected by the second sensor is performed) and the determiner 240 determines that the mobile object 1 has not contact or approached the second object on the basis of a detection result from the contact sensor 12, the controller 250 determines that the second object is not present and causes the mobile object 1 to move such that the mobile object 1 passes through the reference position.

Figure 10:
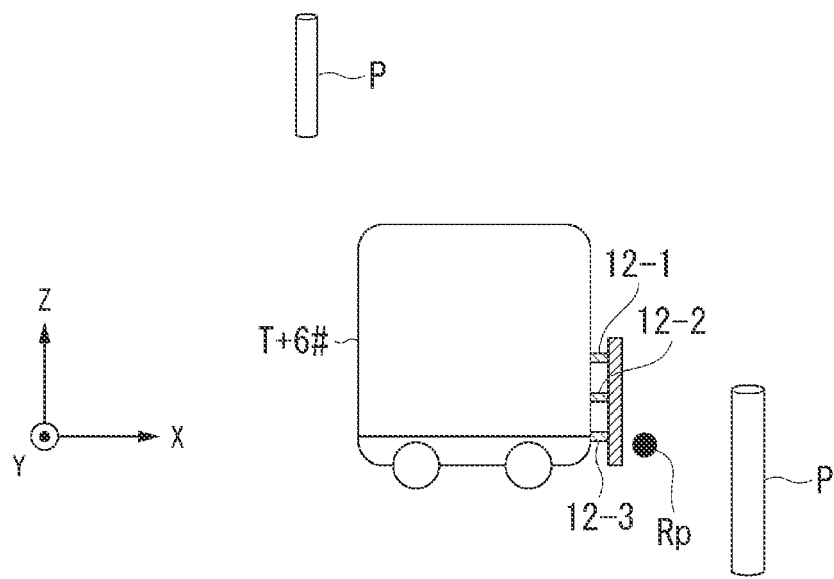
FIG. 10 is a (third) diagram illustrating an example of a movement mode of the mobile object.

FIG. 10 is a (third) diagram illustrating an example of the movement mode of the mobile object 1. At time T+6 #, the mobile object 1 slowly approaches between two poles. For example, the mobile object 1 sets a reference position Rp based on the assumption that a second object is present and approaches the set reference position Rp. At this time, when the determiner 240 does not detect a second object, the mobile object 1 further moves. When a state in which the second object is not detected is maintained for a predetermined time (when the mobile object has moved a predetermined distance), the mobile object 1 estimates that a second object is not present between the two poles and passes between the two poles P and moves to a destination.

Figure 11:
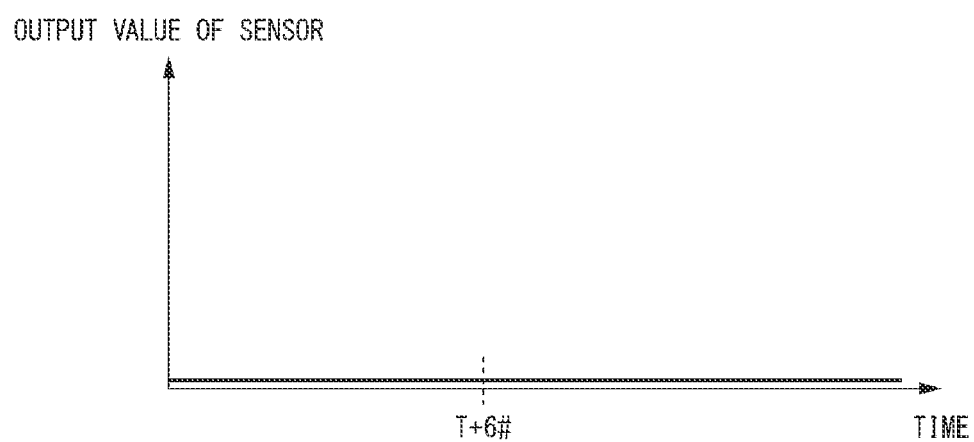
FIG. 11 is a diagram illustrating an example of a temporal change of the output value of the contact sensor.

FIG. 11 is a diagram illustrating an example of a temporal change of an output value of the contact sensor. The vertical axis in FIG. 11 represents the output value of the contact sensor, and the horizontal axis in FIG. 11 represents the time. As described above with reference to FIG. 10, when the mobile object 1 does not come into contact with a second object, the output value changes continuously to zero or a value close to zero. Accordingly, the control device 200 can recognize that a second object is not present in the moving direction of the mobile object 1.

[Case in which Second Object is Present in Some Area]

When the determiner 240 that the mobile object 1 has contacted or approached a second object by causing the mobile object 1 to approach or arrive at the reference position, the controller 250 causes the mobile object 1 to move for a predetermined time or a predetermined distance in a second direction perpendicular to a first direction which is the previous moving direction. At this time, when the determiner 240 determines that the mobile object 1 has not contacted or approached a second object, the controller 250 determines that a second object is not present and causes the mobile object 1 to move in the first direction.

Figure 12:
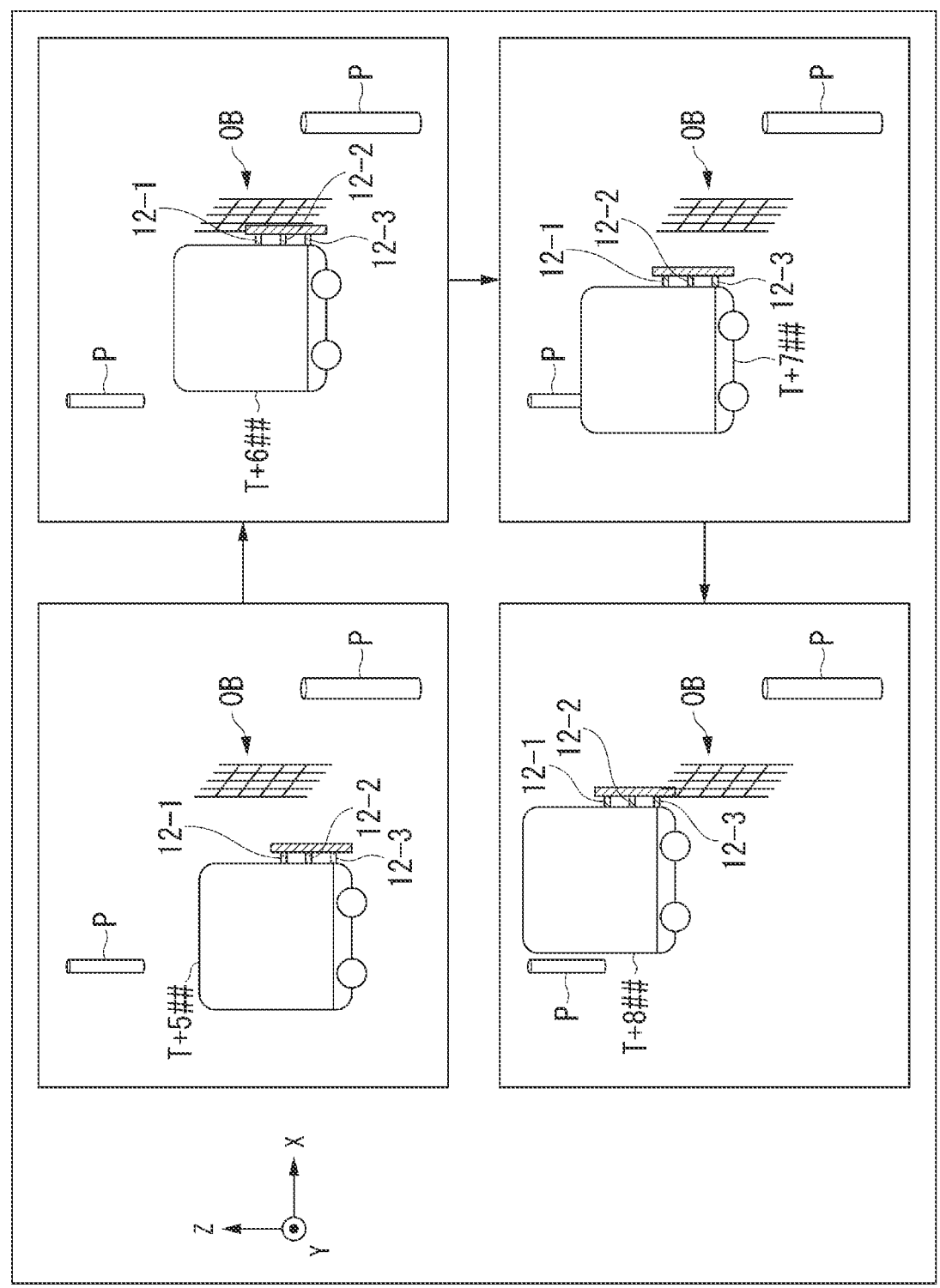
FIG. 12 is a (fourth) diagram illustrating an example of a movement mode of the mobile object.

FIG. 12 is a (fourth) diagram illustrating an example of the movement mode of the mobile object 1. At time T+5 #, the mobile object 1 slowly approaches the reference position between two poles P. At time T+6 ##, the mobile object 1 comes into contact with a second object OB present between the two poles. At time T+7 ##, the mobile object 1 moves in the lateral direction while coming into contact with the second object OB. Accordingly, the mobile object 1 is located at a position other than the second object OB. At this time, the mobile object 1 does not detect contact with the second object OB. At time T+8 ##, the mobile object 1 recognizes that a second object OB is not present ahead and moves forward straightly. Then, the mobile object 1 passes through a position between two poles P and moves to a destination.

Figure 13:
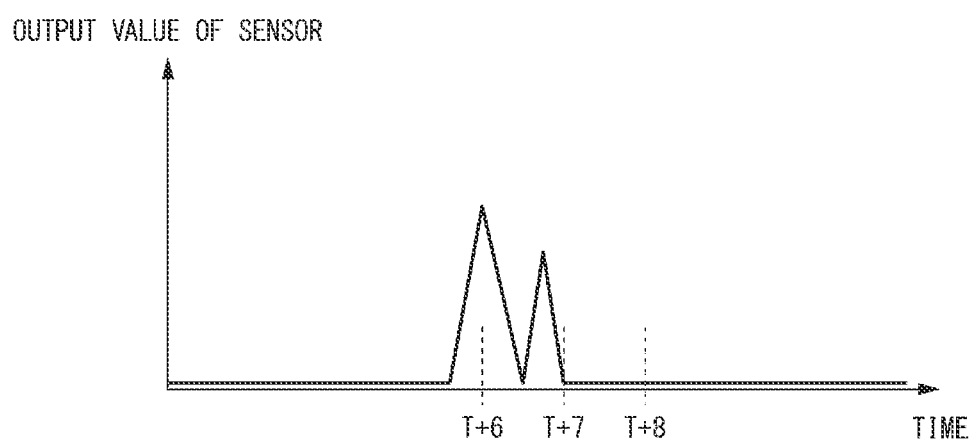
FIG. 13 is a diagram illustrating an example of a temporal change of the output value of the contact sensor.

FIG. 13 is a diagram illustrating an example of a temporal change of an output value of the contact sensor. The vertical axis in FIG. 13 represents the output value of the contact sensor, and the horizontal axis in FIG. 13 represents the time. As described above with reference to FIG. 12, the output value increases when the mobile object 1 comes into contact with a second object, and the output value is in an increased state when the mobile object 1 moves in the lateral direction while coming into contact with the second object. Thereafter, when the mobile object further moves in the lateral direction and the mobile object 1 avoids the second object, the output value is zero or a value close to zero. Accordingly, the control device 200 can recognize that a second object is present in a partial area between the two poles P.

As described above, when a second object which is not recognizable from the detection result from the outside detection device 10 is present, the control device 200 can recognize the second object using the detection result from the contact sensor 12 by causing the mobile object 1 to approach or arrive at the reference position. That is, the control device 200 can support more accurate detection of a second object or more accurately detect an object by causing the mobile object 1 to approach or arrive at the reference position. When a second object is detected, the control device 200 can cause the mobile object 1 to avoid the second object and to move to a destination. Accordingly, even when a second object which is not recognizable by the object recognizer 220 is present, the mobile object 1 can move to a destination more smoothly.

[Flowchart]

Figure 14:
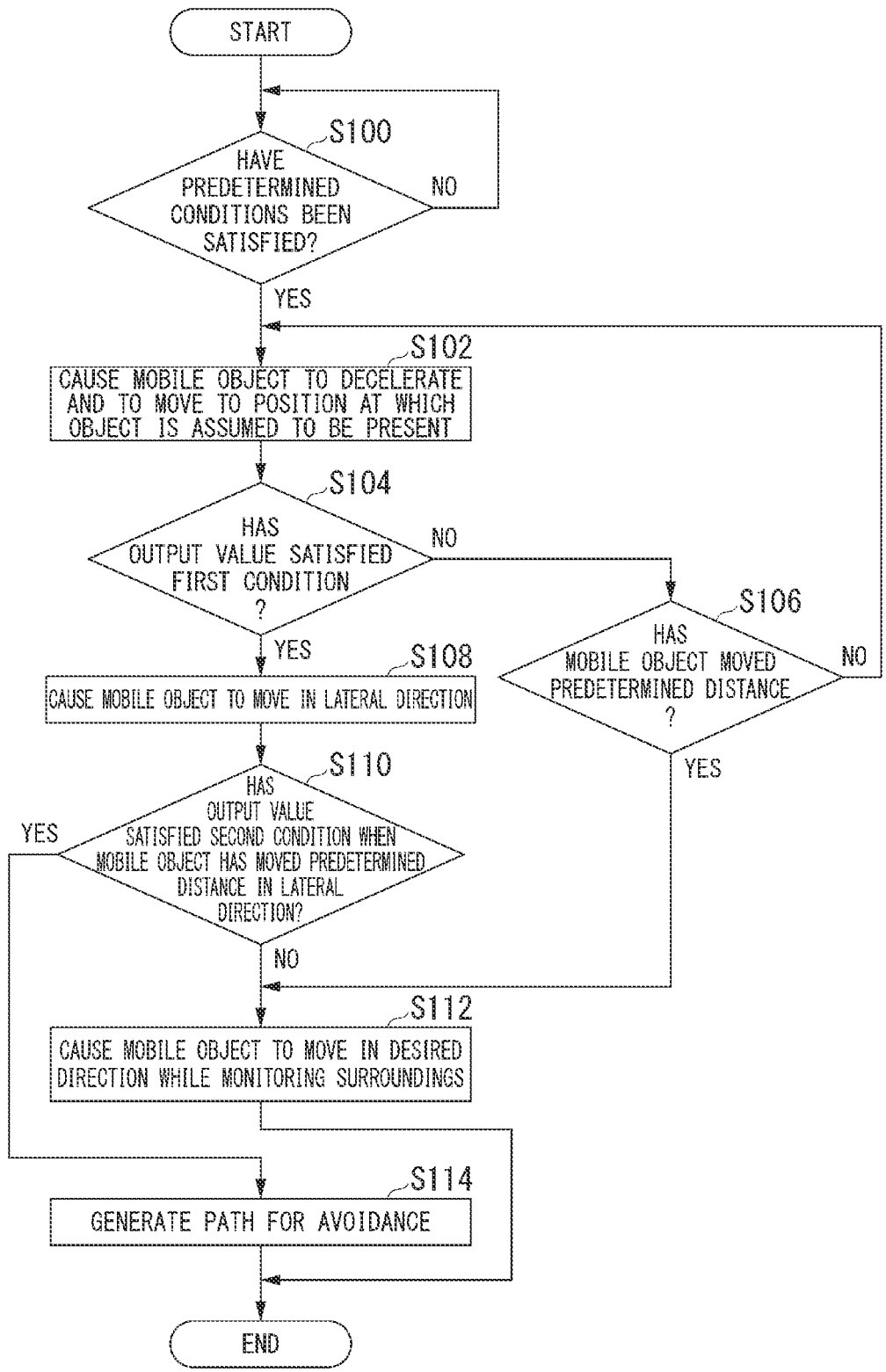
FIG. 14 is a flowchart illustrating an example of a routine of processes which are performed by the control device.

FIG. 14 is a flowchart illustrating an example of a routine of processes which are performed by the control device 200. First, the control device 200 determines whether predetermined conditions have been satisfied (Step S100). When the predetermined conditions have been satisfied, the control device 200 causes the mobile object 1 to decelerate and causes the mobile object 1 to approach a reference position at which a second object is assumed to be present (Step S102). The predetermined conditions include, for example, a condition that a first object has been recognized.

Then, the control device 200 determines whether an output value of the contact sensor 12 has satisfied a first condition (Step S104). The first condition is an output value indicating that the mobile object 1 has come into contact with a predetermined second object.

When the output value has not satisfied the first condition, the control device 200 determines whether the mobile object 1 has moved a predetermined distance (Step S106). When the mobile object 1 has not moved the predetermined distance, the routine returns to Step S102. When the mobile object 1 has moved the predetermined distance, the control device 200 causes the mobile object 1 to move to a destination while monitoring the surroundings of the mobile object 1 (Step S112). For example, when the mobile object 1 has not come into contact with a second object even if the mobile object 1 has moved the predetermined distance, the control device 200 recognizes that a second object is not present near the first object and causes the mobile object 1 to pass by the first object.

When it is determined in Step S104 that the output value has satisfied the first condition (when the mobile object has come into contact with a second object), the control device 200 causes the mobile object 1 to move in the lateral direction (Step S108). Then, the control device 200 determines whether the output value of the contact sensor 12 has satisfied a second condition when the mobile object 1 has moved the predetermined distance in the lateral direction (Step S110). The second condition is a output value indicating that the mobile object has come into contact with a second object (that a contact state is maintained). Specifically, the second condition is a condition that an output value equal to or greater than a threshold value has been maintained for a predetermined time when the mobile object 1 moves in the lateral direction or a condition that an output value equal to or greater than a threshold value has been exceeded predetermined times when the mobile object 1 moves in the lateral direction.

When the output value has not satisfied the second condition, the control device 200 causes the mobile object 1 to move to a destination while monitoring the surroundings of the mobile object 1 (Step S112). When the second condition has not been satisfied, the mobile object 1 is located at a position at which a second object is not present (a position other than a second object) in front of the mobile object 1 and thus the mobile object 1 can pass by the first object without coming into contact with the second object even if it moves straight ahead.

When the output value has satisfied the second condition, the control device 200 estimates that a second object is present, generates a route for avoiding the second object, and causes the mobile object 1 to move to a destination on the basis of the generated route (Step S114). As a result, the routine of this flowchart ends.

Through the aforementioned routine, the control device 200 can recognize whether there is a second object which cannot be recognized by the object recognizer 220 or a position of the second object and cause the mobile object 1 to move smoothly to a destination on the basis of the recognition result.

In the aforementioned description and the aforementioned routine of the flowchart, the control device 200 performs a process of causing the mobile object 1 to approach or arrive at the reference position in order to recognize a second object when a first object has been recognized, but may cause the mobile object 1 to move to a position at which a second object can be detected by the second sensor in order to recognize the second object when the mobile object 1 has arrived at or approached a prescribed position instead (or in addition). For example, the control device 200 assumes that a second object which is not able for the outside detection device 10 to recognize or which is hard to recognize is present at the reference position which is determined on the basis of a position of a first object present within a predetermined range from a prescribed position and cause the mobile object to move to a position at which the second object can be detected by the second sensor.

The "prescribed position" is stored, for example, in map information of the storage device. The prescribed position is a position with a high likelihood of presence of a second object or a position which is set on the basis of a position at which the second object is present. The prescribed position has (an example of the reference position) a high likelihood the second object being present. The prescribed position is a position several meters or several tens of meters away (an example of the reference position) from the second object is present.

When the mobile object 1 has arrived at the prescribed position, the control device 200 assumes the reference position near the prescribed position at which the second object is present and causes the mobile object 1 to approach or arrive at the reference position (causes the mobile object to move to a position at which the second object which is present at the reference position near the first object and which is not recognizable or which is hard to recognize can be detected by the second sensor). When the mobile object 1 has not arrived at the prescribed position, the control device 200 controls movement of the mobile object 1 without assuming that the second object is present (without considering the second object).

The control device 200 may recognize an object or control the mobile object 1 on the basis of correspondence information stored in the storage device of the control device 200. FIG. 15 is a diagram illustrating an example of details of correspondence information 300. The correspondence information 300 is information in which behavior of the mobile object 1 for recognizing an object, a change of the output value of the contact sensor 12 caused by the behavior, a position of an object assumed on the basis of a change of the output value, and behavior of the mobile object 1 for a position of the assumed object are corresponded to each other.

(1) The mobile object 1 performs behavior 1 when behavior a is performed and condition a has been satisfied.

(Behavior a) The mobile object 1 moves in the lateral direction after the mobile object 1 has come into contact with a second object.

(Condition a) The output value of the contact sensor 12 matches a change indicating that a second object is present.

When (Behavior a) and (Condition a) have been satisfied, the mobile object 1 estimates that the second object is present and performs behavior 1 for avoiding the second object.

(2) The mobile object 1 performs behavior 2 when behavior b is performed and condition b has been satisfied.

(Behavior b) A state in which the mobile object 1 is not in contact with a second object is maintained for a predetermined time even when the mobile object 1 further moves without coming into contact with the second object.

(Condition b) The output value of the contact sensor 12 matches a change indicating that a second object is not present.

When (Behavior b) and (Condition b) have been satisfied, the mobile object 1 estimates that the second object is not present and the mobile object 1 is caused to move.

(3) The mobile object 1 performs behavior 3 when behavior c is performed and condition c has been satisfied.

(Behavior c) The mobile object 1 moves a predetermined distance in the lateral direction while the mobile object 1 is in contact with a second object.

(Condition c) The output value of the contact sensor 12 matches a change indicating that a second object with a predetermined width is present.

When (Behavior c) and (Condition c) have been satisfied, the mobile object 1 estimates that the second object with a predetermined width is present and performs behavior 3 for avoiding the second object.

As described above, the control device 200 may recognize a second object on the basis of the correspondence information 300 and control the mobile object 1 on the basis of the recognition result. The correspondence information 300 may include information indicating a relationship between a change of the output value of the contact sensor 12 in a different pattern and a position of an object and information of behavior which is to be performed by the mobile object 1 in addition to the aforementioned information.

Others

An example in which a second object is detected by causing the mobile object 1 to come into contact with the second object has been described above, but the second object may be detected by causing the mobile object 1 to approach the second object instead (in addition). The contact sensor 12 may be a sensor that detects contact with a second object or may be a sensor that detects approach to a second object. A sensor of which an output value changes with contact with a second object or approach to a second object can be used.

The sensor of which an output value changes with contact with a second object or approach to a second object is not limited to a pressure sensor and examples thereof include a microphone, an acoustic sensor, an acceleration sensor, a capacitance sensor, an electrical conductivity sensor, a temperature sensor, a light intensity sensor, and a magnetic sensor. The determiner 240 determines whether the mobile object 1 has approached or come into contact with a second object on the basis of a change of the output value of the sensor (such as a change in sound volume, a change in frequency, a change in electrical resistance, a change in capacitance, a change in conductivity, a change in temperature, a change in light intensity, or a change in magnetism) when the mobile object 1 has approached the second object. As described above, the control device 200 can recognize approach to or contact with a second object using an arbitrary sensor instead of a pressure sensor.

According to the aforementioned embodiment, when a second object which is hard to recognize or which is not recognizable on the basis of a detection result from the radar device, the camera device, or the LIDAR device is present in the moving direction of the mobile object 1, the control device 200 causes the mobile object 1 to move such that it comes into contact with the second object or approaches the second object and causes the mobile object 1 to avoid the second object on the basis of the detection result from the sensor corresponding to movement of the mobile object 1. Accordingly, the control device 200 can more accurately recognize a second object and cause the mobile object 1 to move smoothly to a destination by further recognizing the second object.

The aforementioned embodiment may be described as follows:

A control device for a mobile object that is able to move on both a roadway and a predetermined area other than a roadway, including:

a storage device that stores a program; and a hardware processor, wherein, by causing the hardware processor to execute the program stored in the storage device, a recognition process of recognizing circumstances of the mobile object on the basis of a detection result from a first sensor and a control process of controlling movement of the mobile object on the basis of the circumstances are performed, and wherein, when a prescribed first object has been recognized through the recognition process, it is assumed that a second object which is not recognizable or hard to recognize is present at a reference position which is determined on the basis of a position of the first object, and the mobile object is caused to move to a position at which the second object is able to be detected by a second sensor.

While a mode for carrying out the present invention has been described above with reference to an embodiment, the present invention is not limited to the embodiment, and various modifications and substitutions can be performed thereon without departing from the gist of the present invention.

What is claimed is:

1. A control system for a mobile object, comprising:

a first sensor;

a second sensor, different from the first sensor, that is mounted in the mobile object and is configured to detect contact of an object; and a control device configured to recognize circumstances of the mobile object on the basis of a detection result from the first sensor, recognize a type of an object, recognize whether the recognized object is a first object having a predetermined type, the first object being a type of object with a higher likelihood that a linear object will be present, control movement of the mobile object on the basis of the circumstances, and cause the mobile object to move to a position when the first object has been recognized, the second sensor being able to detect a second object at the position, the second object being at a reference position which is determined on the basis of a position of the first object, the second object being estimated to be suspended from the first object or being located between two first objects, each of the two first objects being the first object.

2. The control system according to claim 1, wherein the control device is configured to control movement of the mobile object in a movement mode different from that when the first object has bee recognized when a third object other than the first object has been recognized.

3. A control system for a mobile object, comprising:

a first sensor;

a second sensor, different from the first sensor, that is mounted in the mobile object and is configured to detect contact of an object; and a control device configured to recognize circumstances of the mobile object on the basis of a detection result from the first sensor, recognize a position of the mobile object, recognize a type of an object, recognize whether the recognized object is a first object having a predetermined type, the first object being a type of object with a higher likelihood that a linear object will be present, control movement of the mobile object on the basis of the circumstances, and cause the mobile object to move to a position when the mobile object has been recognized to have reached a prescribed position, the second sensor being able to detect a second object at the position, the second object being at a reference position which is determined on the basis of a position of the first object within a predetermined range from the prescribed position, the second object being estimated to be suspended from the first object or being located between two first objects, each of the two first objects being the first object.

4. The control system according to claim 3, wherein the control device is configured to control movement of the mobile object without assuming that the second object is present in a movement mode different from that when the first object has been recognized, when the mobile object has not been recognized to have reached the prescribed position.

5. The control system according to claim 1, wherein the control device is configured to determine whether the mobile object contacts or approaches an object on the basis of a detection result from the second sensor, and recognized a first direction which is a moving direction of the mobile object, determine whether or not the mobile object has contacted or approached the object on the basis of the detection result from the second sensor by causing the mobile object to move to a position at which the second object is able to be detected by the second sensor, change a moving direction of the mobile object to a second direction perpendicular to the first direction when the mobile object has contacted or approached the object, cause the mobile object to move the a second direction.

6. The control system according to claim 5, wherein the control device is configured to confirm that the second object is present and to cause the mobile object to perform behavior for avoiding the second object when it is determined that the mobile object has contacted or approached the second object by causing the mobile object to move for a predetermined time or a predetermined distance in the perpendicular direction.

7. The control system according to claim 5, wherein the control device is configured to determine that the second object is not present and to cause the mobile object to move in the first direction when it is determined that the mobile object has not contacted or approached the second object by causing the mobile object to move for a predetermined time or a predetermined distance in the perpendicular direction.

8. The control system according to claim 1, wherein the control device is configured to determine whether the mobile object contacts or approaches an object on the basis of a detection result from the second sensor, and
wherein the control device is configured to perform a process of causing the mobile object to move to a position at which the second object is able to be detected by the second sensor and to determine that the second object is not present and to cause the mobile object to move such that the mobile object passes through the reference position when it is determined that the mobile object has not contacted or approached the object on the basis of the detection result from the second sensor by causing the mobile object to move to a position at which the second object is able to be detected by the second sensor.

9. The control system according to claim 1, wherein the first sensor includes one or more of a radar device, a camera, and a LIDAR device.

10. The control system according to claim 9, wherein the second object is an object having a small length in a vertical direction and having a large length in a horizontal direction, the second object is suspended from the first object and the second object is hard to recognize or which is not recognizable by the control device on the basis of a detection result from the radar device, the camera, and the LIDAR device.

11. A control method that is performed by a computer of a control system for a mobile object, the control method comprising:
a recognition process of recognizing circumstances of the mobile object on the basis of a detection result from a first sensor, recognizing a type of an object, recognizing whether the mobile object is a first object having a predetermined type, the first object being a type of object with a higher likelihood that a linear object will be present;
a control process of controlling movement of the mobile object on the basis of the circumstances; and
a control process of causing the mobile object to move to a position when the first object has been recognized, the second object being able to be detected by a second sensor at the position, the second object being at a reference position which is determined on the basis of a position of the first object, the second sensor being different from the first sensor, the second sensor being mounted in the mobile object and being configured to detect contact of an object, the second object being estimated to be suspended from the first object or being located between two first objects, each of the two first objects being the first object.

12. A control method that is performed by a control system for a mobile object, the control method comprising:
a recognition process of recognizing circumstances of the mobile object on the basis of a detection result from a first sensor, recognizing a type of an object, recognizing whether the recognized object is a first object having a predetermined type, the first object being a type of object with a higher likelihood that a linear object will be present;
a control process of controlling movement of the mobile object on the basis of the circumstances;
a position recognition process of recognizing a position of the mobile object; and
a control process of causing the mobile object to move to a position when the mobile object has been recognized to have reached a prescribed position, the second object being able to be detected by a second sensor at the position, the second object being at a reference position which is determined on the basis of a position of the first object within a predetermined range from the prescribed position, the second sensor being different from the first sensor, the second sensor being mounted in the mobile object and being configured to detect contact of an object, the second object being estimated to be suspended from the first object or being located between two first objects, each of the two first objects being the first object.

13. The control system according to claim 2, wherein the control device is configured to
determine whether the mobile object contacts or approaches an object on the basis of a detection result from the second sensor, and
recognize a first direction which is a moving direction of the mobile object,
determine whether or not the mobile object has contacted or approached the object on the basis of the detection result from the second sensor by causing the mobile object to move to a position at which the second object is able to be detected by the second sensor,
change a moving direction of the mobile object to a second direction perpendicular to the first direction when the mobile object has contacted or approached the object,
cause the mobile object to move in the second direction.

14. The control system according to claim 3, wherein the control device is configured to
determine whether the mobile object contacts or approaches an object on the basis of a detection result from the second sensor, and
recognize a first direction which is a moving direction of the mobile object,
determine whether or not the mobile object has contacted or approached the object on the basis of the detection result from the second sensor by causing the mobile object to move to a position at which the second object is able to be detected by the second sensor,
change a moving direction of the mobile object to a second direction perpendicular to the first direction when the mobile object has contacted or approached the object,
cause the mobile object to move in the second direction.

15. The control system according to claim 4, wherein the control device is configured to
determine whether the mobile object contacts or approaches an object on the basis of a detection result from the second sensor, and
recognize a first direction which is a moving direction of the mobile object,
determine whether or not the mobile object has contacted or approached the object on the basis of the detection result from the second sensor by causing the mobile object to move to a position at which the second object is able to be detected by the second sensor,
change a moving direction of the mobile object to a second direction perpendicular to the first direction when the mobile object has contacted or approached the object,
cause the mobile object to move in the second direction.

16. The control system according to claim 6, wherein the control device is configured to determine that the second object is not present and to cause the mobile object to move in the first direction when it is determined that the mobile object has not contacted or approached the second object by causing the mobile object to move for a predetermined time or a predetermined distance in the perpendicular direction.

17. The control system according to claim 3, wherein the control device is configured to determine whether the mobile object contacts or approaches an object on the basis of a detection result from the second sensor, and wherein the control device is configured to perform a process of causing the mobile object to move to a position at which the second object is able to be detected by the second sensor and to determine that the second object is not present and to cause the mobile object to move such that the mobile object passes through the reference position when it is determined that the mobile object has not contacted or approached the object on the basis of the detection result from the second sensor by causing the mobile object to move to a position at which the second object is able to be detected by the second sensor.

18. The control system according to claim 4, wherein the control device is configured to determine whether the mobile object contacts or approaches an object on the basis of a detection result from the second sensor, and wherein the control device is configured to perform a process of causing the mobile object to move to a position at which the second object is able to be detected by the second sensor and to determine that the second object is not present and to cause the mobile object to move such that the mobile object passes through the reference position when it is determined that the mobile object has not contacted or approached the object on the basis of the detection result from the second sensor by causing the mobile object to move to a position at which the second object is able to be detected by the second sensor.

19. The control system according to claim 3, wherein the first sensor includes one or more of a radar device, a camera, and a LIDAR device.

20. The control system according to claim 4, wherein the first sensor includes one or more of a radar device, a camera, and a LIDAR device.

\* \* \* \* \*